United States Patent
Odajima

(10) Patent No.: US 12,026,097 B2
(45) Date of Patent: Jul. 2, 2024

(54) ARITHMETIC PROCESSING APPARATUS AND ARITHMETIC PROCESSING METHOD

(71) Applicant: Fujitsu Limited, Kawasaki (JP)

(72) Inventor: Tetsuya Odajima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 18/191,282

(22) Filed: Mar. 28, 2023

(65) Prior Publication Data
US 2024/0028517 A1     Jan. 25, 2024

(30) Foreign Application Priority Data

Jul. 21, 2022   (JP) ................................. 2022-116734

(51) Int. Cl.
*G06F 12/00*     (2006.01)
*G06F 12/0862*   (2016.01)

(52) U.S. Cl.
CPC .. *G06F 12/0862* (2013.01); *G06F 2212/1021* (2013.01)

(58) Field of Classification Search
CPC ...................... G06F 12/0862; G06F 2212/1021
See application file for complete search history.

(56) References Cited

U.S. PATENT DOCUMENTS

| | | | |
|---|---|---|---|
| 8,429,351 B1 * | 4/2013 | Yu ....................... | G06F 12/0862 |
| | | | 711/E12.004 |
| 2008/0155196 A1 | 6/2008 | Black et al. | |
| 2009/0019229 A1 * | 1/2009 | Morrow ............. | G06F 12/0862 |
| | | | 711/137 |
| 2015/0121038 A1 | 4/2015 | Dasika et al. | |
| 2018/0341591 A1 * | 11/2018 | Drerup ................ | G06F 12/0862 |
| 2019/0079871 A1 * | 3/2019 | Bradbury ............ | G06F 12/0862 |

FOREIGN PATENT DOCUMENTS

| | | |
|---|---|---|
| JP | 2008-159057 A | 7/2008 |
| JP | 2010-532904 A | 10/2010 |
| WO | 2009/009704 A1 | 1/2009 |

\* cited by examiner

*Primary Examiner* — John A Lane
(74) *Attorney, Agent, or Firm* — Fujitsu Intellectual Property Center

(57) ABSTRACT

An arithmetic processing apparatus includes: caches disposed between a core and a memory; prefetchers that have different data access prediction algorithms; and a processor configured to: monitor a miss rate of prefetching by each of the prefetchers; determine a prefetcher to be caused to perform prefetching based on the miss rate; monitor a usage rate of buses between the caches or between the caches and the memory; cause the prefetchers corresponding to the caches on a side of the core of a low usage rate bus in which the usage rate is low to issue a prefetch with high probability and a prefetch with low probability; and cause the prefetchers corresponding to the caches on a side of the core of a high usage rate bus in which the usage rate is high to stop issuing the prefetch with low probability and to issue the prefetch with high probability.

7 Claims, 8 Drawing Sheets

FIG. 3

| PREFETCHER | MISS RATE |
| --- | --- |
| PREFETCHER 111 | 5.0% |
| PREFETCHER 112 | 4.0% |
| PREFETCHER 113 | 3.0% |

FIG. 7

|  |  | THREAD ##0 | THREAD ##1 |
|---|---|---|---|
| L1 MISS RATE | PREFETCHER 111 | 10% | 3% |
|  | PREFETCHER 112 | 8% | 3% |
|  | PREFETCHER 113 | 5% | 1% |
| L2 MISS RATE | PREFETCHER 111 | 5% | 2% |
|  | PREFETCHER 112 | 4% | 2% |
|  | PREFETCHER 113 | 3% | 0% |
| L1 TO L2 BAND OCCUPANCY RATE | | 60% | 10% |
| L2 TO Mem BAND OCCUPANCY RATE | | 60% | 10% |

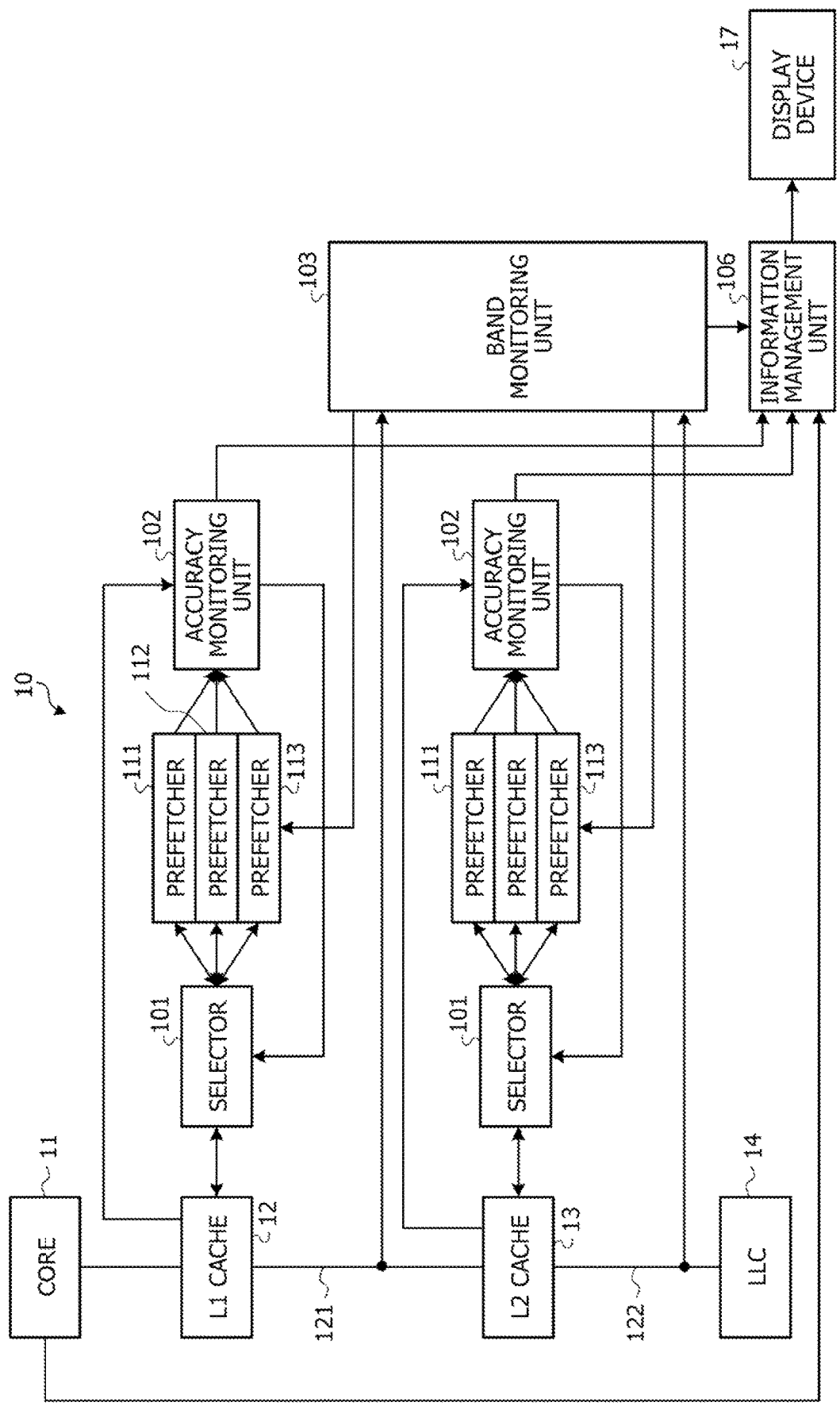

ARITHMETIC PROCESSING APPARATUS AND ARITHMETIC PROCESSING METHOD

CROSS-REFERENCE TO RELATED APPLICATION

This application is based upon and claims the benefit of priority of the prior Japanese Patent Application No. 2022-116734, filed on Jul. 21, 2022, the entire contents of which are incorporated herein by reference.

FIELD

The embodiments discussed herein are related to an arithmetic processing unit and an arithmetic processing method.

BACKGROUND

Operating frequency of a processor has been significantly improved in recent years. By contrast, improvement in the operation speed of a dynamic random-access memory (DRAM) that is normally used as a main memory is sluggish. Accordingly, in order to sufficiently utilize the performance of a processor, research on an architecture for improving the efficiency of data transfer has been actively conducted. In an information processing apparatus, a cache memory of higher-speed data access compared to a main memory is normally disposed in a central processing unit (CPU). Placing recently referred data in the cache memory may reduce the latency caused by referring to the main memory.

Japanese National Publication of International Patent Application No. 2010-532904, Japanese Laid-open Patent Publication No. 2008-159057, U.S. Patent Application Publication No. 2015/0121038, and U.S. Patent Application Publication No. 2019/0079871 are disclosed as related art.

SUMMARY

According to an aspect of the embodiments, an arithmetic processing apparatus includes: a plurality of caches that is hierarchically disposed between a core and a main memory; prefetchers that are disposed in a plurality of numbers for each of the caches and have different data access prediction algorithms; and a processor configured to: monitor, for each of the caches, a miss rate of prefetching by each of the prefetchers; determine a prefetcher to be caused to perform prefetching based on the miss rate; monitor a usage rate of any or all of buses between the caches or between the caches and the main memory in a reading direction; cause the prefetchers corresponding to the caches on a side of the core of a low usage rate bus in which the usage rate is low to issue a prefetch with high probability and a prefetch with low probability; and cause the prefetchers corresponding to the caches on a side of the core of a high usage rate bus in which the usage rate is high to stop issuing the prefetch with low probability and to issue the prefetch with high probability.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of a calculation result of the miss rate of each prefetcher by an accuracy monitoring unit;

FIG. 7 is a diagram illustrating an example of data obtained by the accuracy monitoring unit and a band monitoring unit; and FIG. 8 is a diagram illustrating details of control mechanisms for an L1 cache and an L2 cache in a CPU according to Embodiment 3.

DESCRIPTION OF EMBODIMENTS

Figure 1:
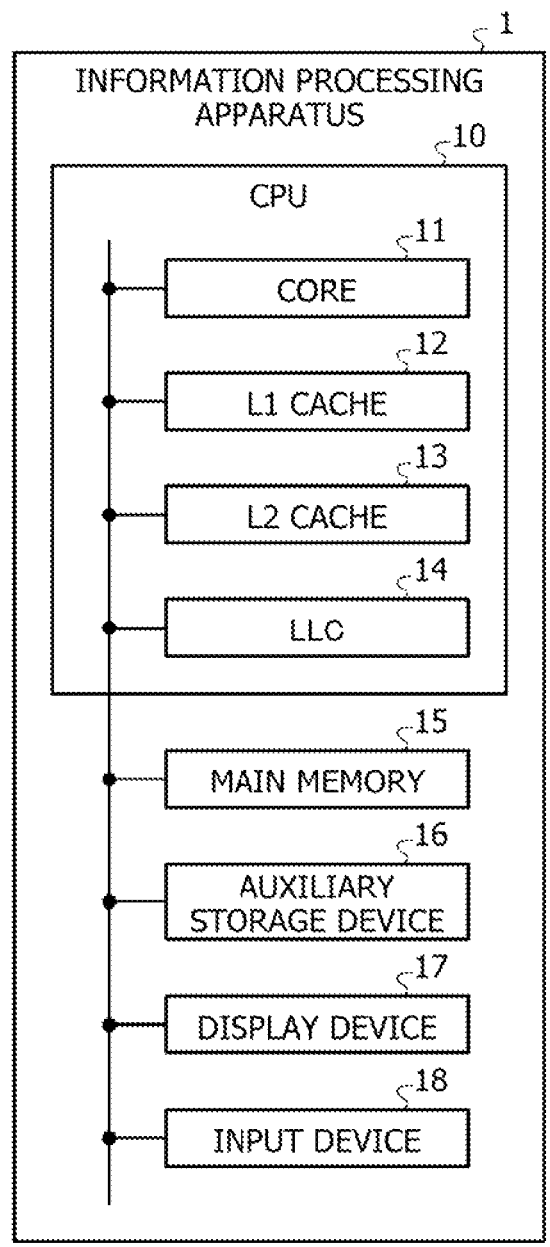
FIG. 1 is a schematic diagram illustrating an overall configuration of an information processing apparatus.

As a technique of cache management, there is a function called hardware prefetching in which data to be used in the future in arithmetic operation being executed is copied in advance from a main memory to a cache, based on the regularity of memory access of a program. One that performs prefetching is called a prefetcher. By a prefetcher issuing an optimum prefetch, it is possible to reduce the cost for a core to reach and read data from a memory at the timing when the core uses the data. In related art, one type of prefetcher is disposed for one cache.

Normally, a distance of issuing a prefetch is variable. The distance of issuing a prefetch is an address interval to data to be prefetched next. For example, there are various cases such as a case where data of an adjacent line is to be prefetched and a case where data that is 280 bytes ahead is to be prefetched.

By contrast, an algorithm for estimating a data access pattern in prefetching is fixed. Algorithms for prefetching include various algorithms such as, for example, Stream prefetching and Stride prefetching. Stream prefetching is an algorithm that focuses on access to contiguous address areas for prefetching the value of an address that is a predetermined distance ahead among contiguous addresses. Stride prefetching is an algorithm that focuses on access at a periodic address interval for prefetching by adding a predetermined stride to an accessed address. For example, a prefetcher to which Stride prefetching is applied as an algorithm for estimating a data access pattern in prefetching performs prefetching by using Stride prefetching regardless of the type of arithmetic operation.

As a technique related to prefetching, a technique has been proposed in which a row of data is prefetched from a memory to a cache in accordance with one or a plurality of prefetching strategies. A technique has been proposed in which prefetching is performed based on a prefetch hint indicating that two or more load instructions are likely to request data from the same cache page. A technique has been proposed in which one of a plurality of selectable prefetch strategies is selected based on an access pattern, and prefetching is executed in accordance with the selected prefetch strategy. In addition, a technique has been proposed in which the speed of prefetching data from a memory to a cache is controlled based on a bus bandwidth.

However, depending on the program, a case may be considered in which arithmetic operations having various characteristics are executed. In the arithmetic operations having different characteristics, the accuracy of prefetching may be improved by using a prefetch of the operation policy set according to each characteristic. By contrast, since an operation policy of prefetching is fixed in related art, the accuracy of prefetching may not be high enough in a program that executes arithmetic operations having various characteristics, and the performance of program execution may be degraded. By aggressively issuing prefetches, the probability that data exists in a cache may be increased. However, in a case where a large number of prefetches are issued, a band of a data bus between caches or between a main memory and a cache is compressed, and data transfer of a higher priority is hindered. This also causes degradation in the performance of program execution. Therefore, it is difficult to improve the processing performance of arithmetic operation.

In the technique of executing prefetching in accordance with one or a plurality of prefetching strategies, the prefetching strategy to be used is fixed and it is difficult to perform prefetching in accordance with the operation policy suitable for the characteristic of arithmetic operation. In the technique of performing prefetching based on a prefetch hint, a prefetch may be issued at an appropriate timing, but the prefetching strategy to be used is fixed and it is difficult to perform prefetching in accordance with the operation policy suitable for the characteristic of arithmetic operation. In the technique of selecting one of a plurality of selectable prefetch strategies based on an access pattern, it is difficult to appropriately adjust the number of prefetches to be issued. In the technique of controlling the speed of prefetching based on a bus bandwidth, it is difficult to perform prefetching in accordance with the operation policy suitable for the characteristic of arithmetic operation. Therefore, it is difficult for the above techniques to improve the processing performance of arithmetic operation.

In view of the above, an object of the disclosed technique is to provide an arithmetic processing unit and an arithmetic processing method that improve the processing performance of arithmetic operation.

Hereinafter, embodiments of an arithmetic processing unit and an arithmetic processing method disclosed in the present application will be described in detail with reference to the drawings. The arithmetic processing unit and the arithmetic processing method disclosed in the present application are not limited to the following embodiments.

Embodiment 1

FIG. 1 is a schematic diagram illustrating an overall configuration of an information processing apparatus. As illustrated in FIG. 1, an information processing apparatus 1 includes a core 11, an L1 cache 12, an L2 cache 13, a low level cache (LLC) 14, a main memory 15, an auxiliary storage device 16, a display device 17, and an input device 18. The core 11 is coupled to each of the L1 cache 12, the L2 cache 13, the LLC 14, the main memory 15, the auxiliary storage device 16, the display device 17, and the input device 18 via a bus. For example, the core 11, the L1 cache 12, the L2 cache 13, and the LLC 14 are mounted on a central processing unit (CPU) 10 that is an arithmetic processing unit.

The core 11 reads various programs and the like stored in the auxiliary storage device 16 and loads the programs and the like into the main memory 15, and executes arithmetic operation by using data stored in the L1 cache 12, the L2 cache 13, the LLC 14, and the main memory 15.

The L1 cache 12 is a cache memory with high operation speed having a capacity smaller than those of the L2 cache 13 and the LLC 14, and is a cache memory to be read first at the time of data access by the core 11. For example, the L1 cache 12 is a static random-access memory (SRAM).

The L2 cache 13 is a cache memory with high operation speed normally having a capacity larger than that of the L1 cache 12, and is a cache memory to be read next in a case where a cache miss occurs in the L1 cache 12 at the time of data access by the core 11. For example, the L2 cache 13 is also an SRAM.

The LLC 14 is a cache memory with high operation speed normally having a capacity larger than that of the L2 cache 13, and is a cache memory to be read next in a case where a cache miss occurs in the L2 cache 13 at the time of data access by the core 11. The LLC 14 may also be referred to as an L3 cache. For example, the LLC 14 is also an SRAM.

In the present embodiment, description will be given for a case in which the information processing apparatus 1 includes three cache memories of the L1 cache 12, the L2 cache 13, and the LLC 14. However, the number of levels of cache memory is not limited to this case. For example, the information processing apparatus 1 does not have to include the L2 cache 13 or the LLC 14, or may include four or more levels.

The main memory 15 is a large-capacity main storage device with an operation speed lower than those of the L1 cache 12, the L2 cache 13, and the LLC 14. Data to be used for arithmetic operation by the core 11 is stored in the main memory 15. The main memory 15 receives access from the core 11 in a case where there is no data to be accessed in any of the L1 cache 12, the L2 cache 13, and the LLC 14. For example, the main memory 15 is a dynamic random-access memory (DRAM).

For example, the auxiliary storage device 16 is a hard disk drive (HDD), a solid-state drive (SSD), or the like. An operating system (OS) and various programs for performing arithmetic operation are stored in the auxiliary storage device 16.

For example, the display device 17 is a monitor, a display, or the like. The display device 17 presents information to a user by displaying a result of arithmetic operation by the core 11. For example, the input device 18 is a keyboard, a mouse, or the like. A user uses the input device 18 and inputs data and instructions to the information processing apparatus 1 while referring to a screen displayed on the display device 17. The display device 17 and the input device 18 may be configured as a single piece of hardware.

Figure 2:
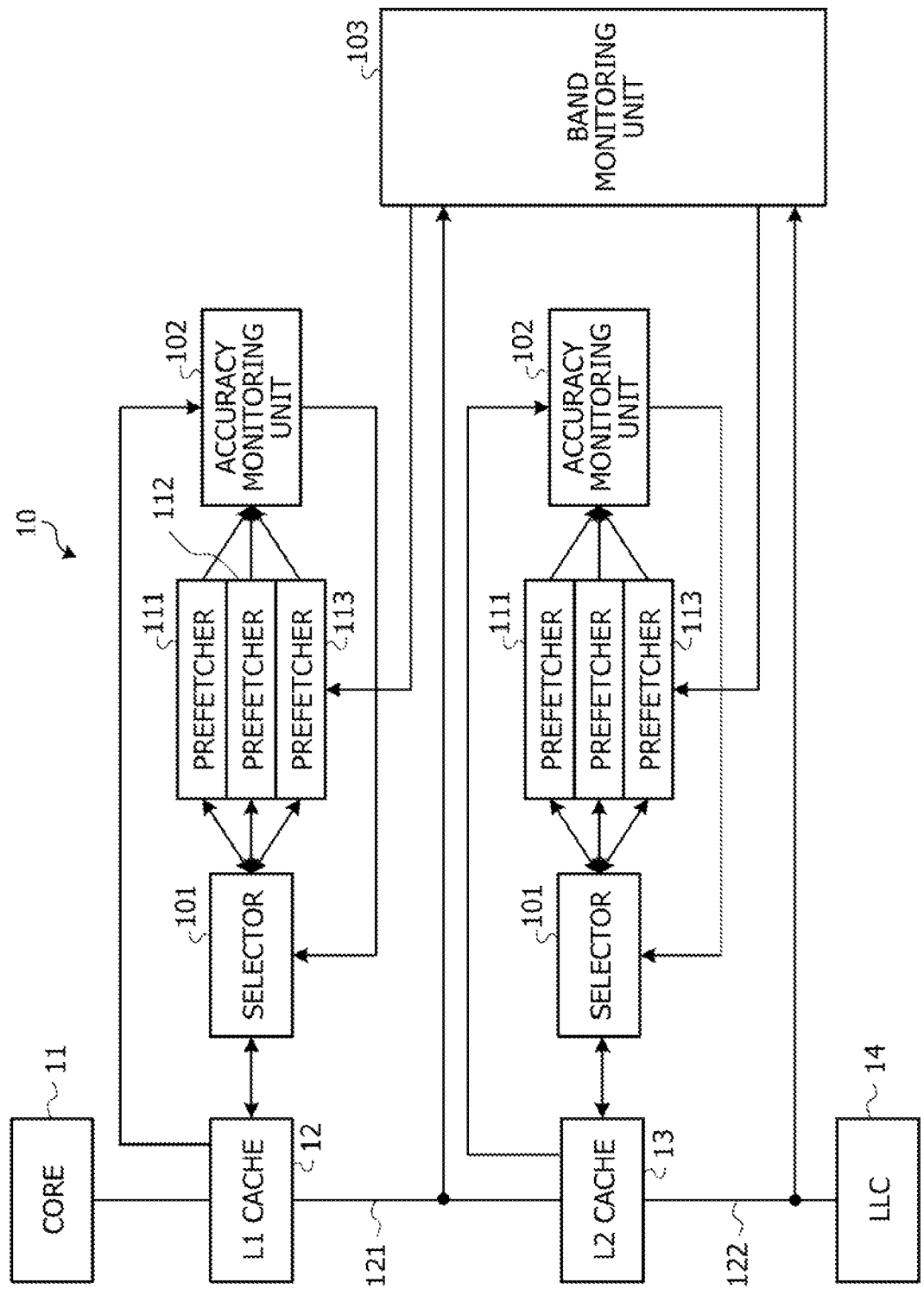
FIG. 2 is a diagram illustrating details of control mechanisms for an L1 cache and an L2 cache in a CPU according to Embodiment 1.

FIG. 2 is a diagram illustrating details of control mechanisms for the L1 cache and the L2 cache in the CPU according to Embodiment 1. FIG. 2 illustrates that the L1 cache 12, the L2 cache 13, and the LLC 14 are coupled in multiple stages in order to clarify the hierarchical structure of these caches. In actual coupling, as illustrated in FIG. 1, these caches are coupled to the bus extending from the core 11.

As illustrated in FIG. 2, the CPU 10 includes a selector 101, an accuracy monitoring unit 102, and prefetchers 111 to 113 as control mechanisms for prefetching, for each of the L1 cache 12 and the L2 cache 13. Additionally, the CPU 10 includes a band monitoring unit 103 that collectively performs control for prefetching for the L1 cache 12 and the L2 cache 13. In the present embodiment, as an example, the control mechanisms for prefetching are disposed for the L1 cache 12 and the L2 cache 13. However, similar control mechanisms may be disposed for other caches such as the LLC 14.

The prefetchers 111 to 113 are hardware prefetchers that perform prefetching with different data access prediction algorithms. The prefetchers 111 to 113 are referred to as prefetchers 110 when they are not distinguished from each other. The prefetcher 110 includes a prefetch buffer that stores prefetched data. There are three prefetchers 110 in FIG. 2, but the number of prefetchers 110 having different data access prediction algorithms may be any number as long as the number is two or more.

For example, Stream prefetching, Stride prefetching, Temporal prefetching, and the like are data access prediction algorithms for estimating a data access pattern in prefetching. For example, the prefetcher 111 performs prefetching using Stream prefetching, the prefetcher 112 performs prefetching using Stride prefetching, and the prefetcher 113 performs prefetching using Temporal prefetching. Representative data access prediction algorithms will be described below.

Description will be given for the operation of the prefetcher 110 in a case where Stream prefetching is used. In a case where a cache miss is detected in a certain address block A, the prefetcher 110 prefetches address block A+1 that comes after address block A, and saves the data in its own prefetch buffer. Depending on the parameters of the hardware, the prefetcher 110 may simultaneously save the data of four address blocks A+1 to A+4 that come after address block A in the prefetch buffer when the miss is detected. After that, in a case where access to the data in the prefetch buffer occurs, for example, the prefetcher 110 moves the data to the L1 cache 12, and subsequently sequentially prefetches address blocks A+2, A+3, . . . that come after while saving the data in the prefetch buffer.

Next, description will be given for the operation of the prefetcher 110 in a case where Stride prefetching is used. In a case where contiguous memory accesses are δ address blocks ahead, when a cache miss is detected in address block A, the prefetcher 110 is unable to cope with the cache miss by the Stream prefetching of address block A+1. Accordingly, in a case where it is detected that the accesses are made at equal intervals, when a cache miss is detected in address block A, the prefetcher 110 prefetches address block A+δ and saves the data in the prefetch buffer. Also in this case, the prefetcher 110 may simultaneously prefetch a plurality of address blocks depending on the parameters. In a case where there is data in the prefetch buffer in subsequent data access, for example, the prefetcher 110 transfers the data to the L1 cache 12, prefetches address block A+δ*2, and saves the data in the prefetch buffer. By setting δ=1, the prefetcher 110 may perform operation equivalent to that using Stream prefetching by using Stride prefetching.

Next, description will be given for the operation of the prefetcher 110 in a case where Temporal prefetching is used. In a case where a data access pattern that is repeated many times in an access pattern that appears to be random at a glance has been successfully extracted from an access pattern history, the prefetcher 110 performs prefetching with the extracted pattern. For example, in a case of an access pattern of "N, A, B, C, E, G, H, A, B, C, I, J, K, A, B, C, L, M, N, O, A, B, C, . . . ", the prefetcher 110 determines that A, B, C is repeated, and performs prefetching in the order of address blocks A, B, and C.

The operation of the prefetcher 110 will be described by using the L1 cache 12 as an example. The prefetcher 110 that actually performs prefetching is selected by the selector 101 from among the prefetchers 111 to 113.

The prefetcher 110 receives, from the band monitoring unit 103, input of an instruction of the operation mode in which prefetching is performed, aggressive prefetching or conservative prefetching. Each prefetcher 110 performs prefetching in the operation mode designated by the band monitoring unit 103.

Aggressive prefetching is an operation mode in which a prefetch with low probability is also issued in addition to a prefetch with high probability. Conservative prefetching is an operation mode in which a prefetch with low probability is not issued and a prefetch with high probability is issued.

In the case of using Stream prefetching, for example, when a cache miss occurs for address block A, the probability that the data of address block A+1 is hit is the highest, followed by address blocks A+2, A+3, . . . . Accordingly, in the case of conservative prefetching, when a cache miss occurs for address block A, the prefetcher 110 sets address block A+1 as a prefetching target. By contrast, in the case of aggressive prefetching, the prefetcher 110 sets address blocks A+1 to A+4 as prefetching targets.

Each prefetcher 110 acquires, via the selector 101, information on data access by the core 11 and information on a cache miss in the L1 cache 12. When a cache miss is detected, each prefetcher 110 calculates an address block to be prefetched in accordance with the data access prediction algorithm used by the prefetcher. For example, the prefetchers 111 to 113 use different data access prediction algorithms and calculate their respective address blocks to be prefetched.

After that, all the prefetchers 110 including both the prefetcher 110 selected by the selector 101 and the prefetchers 110 not selected by the selector 101 output information on the calculated address blocks to the accuracy monitoring unit 102.

The prefetcher 110 selected by the selector 101 acquires data from the calculated address block and stores the data in its own prefetch buffer. In a case where data to be accessed is stored in its own prefetch buffer, the prefetcher 110 selected by the selector 101 transfers the data held by the prefetcher to the L1 cache 12 via the selector 101. After that, pieces of data are sequentially prefetched in accordance with the used data access prediction algorithm.

The accuracy monitoring unit 102 holds, as a record, information on various parameters for calculating a prefetch miss rate of each prefetcher 110. For example, the accuracy monitoring unit 102 holds, as parameters, a prefetched address of each prefetcher 110, the number of cache read accesses, and the number of prefetch hits of each prefetcher 110. In a case where the accuracy monitoring unit 102 has a simultaneous multi-threading (SMT) function, the accuracy monitoring unit holds the above-described parameters for each thread.

When data-reading access to the L1 cache 12 occurs, the accuracy monitoring unit 102 receives, from the L1 cache 12, a notification indicating the occurrence of cache reading. The accuracy monitoring unit 102 increments the number of cache read accesses by one.

The accuracy monitoring unit 102 acquires, from each prefetcher 110, a result of calculation of an address block to be prefetched by each prefetcher 110. The accuracy monitoring unit 102 stores an address block prefetched by each prefetcher 110. The number of address blocks stored by the accuracy monitoring unit 102 depends on the size of the storage area included in the accuracy monitoring unit 102. The accuracy monitoring unit 102 counts and stores the number of times of prefetching by the prefetcher 110.

When a cache miss occurs in the L1 cache 12, the accuracy monitoring unit 102 receives, from the L1 cache 12, input of information on the cache miss including the address block to be accessed. The accuracy monitoring unit 102 determines whether an address block that is the same as the address block in which the cache miss has occurred matches any of the address blocks prefetched in the past by each prefetcher 110. The accuracy monitoring unit 102 increments the number of prefetch hits by one for the prefetcher 110 in which the address block has matched.

The accuracy monitoring unit 102 preliminarily includes information on the timing of selecting the prefetcher 110. For example, the timing of selecting may be periodic, or may be the case where the number of times of occurrences of cache miss reaches a predetermined number. When the timing of selecting the prefetcher 110 is reached, the accuracy monitoring unit 102 subtracts the number of prefetch hits from the number of cache read accesses for each prefetcher 110, and calculates the number of prefetch misses at that time point. The accuracy monitoring unit 102 calculates a miss rate of each prefetcher 110 by dividing the number of prefetch misses of each prefetcher 110 by the number of prefetches and converting the obtained result into a percentage. After that, the accuracy monitoring unit 102 notifies the selector 110 of the prefetcher 110 having the lowest miss rate.

For example, the accuracy monitoring unit 102 monitors the miss rate of prefetching by each prefetcher 110 in the L1 cache 12, which is the corresponding cache, and determines the prefetcher 110 to be caused to perform prefetching based on the miss rate. The accuracy monitoring unit 102 holds the prefetching result of each prefetcher 110 in the L1 cache 12 for a past predetermined period, and calculates the miss rate of each prefetcher 110 based on the information on data that has been accessed in the predetermined period and the prefetching result. The accuracy monitoring unit 102 determines to cause the low miss rate prefetcher, which is the prefetcher 110 having the lowest miss rate, to perform prefetching.

FIG. 3 is a diagram illustrating an example of a calculation result of the miss rate of each prefetcher by the accuracy monitoring unit. For example, in a case where a calculation result 130 illustrated in FIG. 3 is obtained, the accuracy monitoring unit 102 determines that the miss rate of the prefetcher 111 is the highest and the miss rate of the prefetcher 113 is the lowest. After that, the accuracy monitoring unit 102 notifies the selector 101 of information on the prefetcher 110 having the lowest miss rate.

The selector 101 preliminarily has an initial value of the prefetcher 110 that is actually caused to execute prefetching. For example, the selector 101 has the prefetcher 111 as an initial value. In a state where the information on the prefetcher 110 having the lowest miss rate is not notified from the accuracy monitoring unit 102 such as immediately after the activation of the information processing apparatus 1, the selector 101 selects the prefetcher 110 indicated by the initial value as the prefetcher 110 that is actually caused to execute prefetching. Accordingly, the selector 101 causes the prefetcher 110 indicated by the initial value to execute prefetching related to the L1 cache 12.

When the timing of selecting the prefetcher 110 is reached, the selector 101 receives notification of information on the prefetcher 110 having the lowest miss rate from the accuracy monitoring unit 102. The selector 101 selects the prefetcher 110 notified as the prefetcher 110 that is actually caused to execute prefetching. The selector 101 causes the prefetcher 110 having the lowest miss rate at that time point to execute prefetching related to the L1 cache 12.

The band monitoring unit 103 monitors the usage rate of buses in the reading direction of the L1 cache 12 and the L2 cache 13 for which prefetching is controlled, for example, buses on the upstream side. For example, for the L1 cache 12, the band monitoring unit 103 monitors the usage rate of a bus 121 between the L1 cache 12 and the L2 cache 13. For the L2 cache 13, the band monitoring unit 103 monitors the usage rate of a bus 122 between the L2 cache 13 and the LLC 14. In the present embodiment, the band monitoring unit 103 does not monitor the bus between the LLC 14 and the main memory 15 since the operation mode of prefetching for the LLC 14 is not adjusted. However, the operation mode of prefetching for the LLC 14 may be adjusted by monitoring the bus.

For example, the band monitoring unit 103 monitors the amount of data transfer in a bus as the usage rate of the bus. Since the band monitoring unit 103 performs similar processing for all buses, monitoring of the bus 121 between the L1 cache 12 and the L2 cache 13 will be described below.

The band monitoring unit 103 preliminarily has a bus usage rate threshold for determining whether the usage rate of the bus 121 is high or low. For example, the band monitoring unit 103 may set the bus usage rate threshold to 50% of the maximum amount of transfer of the bus 121.

The band monitoring unit 103 compares the usage rate of the bus 121 with the bus usage rate threshold. The band monitoring unit 103 determines that the usage rate of the bus 121 is high when the usage rate of the bus 121 is equal to or higher than the bus usage rate threshold, and determines that the usage rate of the bus 121 is low when the usage rate of the bus 121 is lower than the bus usage rate threshold.

When it is determined that the usage rate of the bus 121 between the L1 cache 12 and the L2 cache 13 is high, the band monitoring unit 103 determines that prefetching for the L1 cache 12, which receives data through the bus, is performed by conservative prefetching. The band monitoring unit 103 instructs the prefetcher 110 of the L1 cache 12 to use conservative prefetching as the operation mode.

Conversely, when it is determined that the usage rate of the bus 121 between the L1 cache 12 and the L2 cache 13 is low, the band monitoring unit 103 determines that prefetching for the L1 cache 12 is performed by aggressive prefetching. The band monitoring unit 103 instructs the prefetcher 110 of the L1 cache 12 to use aggressive prefetching as the operation mode.

For example, the band monitoring unit 103 monitors the usage rate of each bus in the reading direction between the caches and between the LLC 14 and the main memory 15. The band monitoring unit 103 causes the prefetcher 110 corresponding to the cache on the core 11 side of the low usage rate bus having a low usage rate to issue a prefetch with high probability and a prefetch with low probability. The band monitoring unit 103 causes the prefetcher 110 corresponding to the cache on the core 11 side of the high usage rate bus having a high usage rate to stop issuing a prefetch with low probability and to issue a prefetch with high probability. For example, the band monitoring unit 103 determines whether the operation mode of the prefetcher 110 having the lowest miss rate is set to the mode in which a prefetch with high probability and a prefetch with low probability are issued, or to the mode in which issuance of a prefetch with low probability is stopped and a prefetch with high probability is issued.

The band monitoring unit 103 determines an operation mode for each of the buses 121 and 122. For example, in a case where the usage rates of the bus 121 and the bus 122 are both high, the band monitoring unit 103 uses conservative prefetching for both of the L1 cache 12 and the L2 cache 13. In a case where the usage rate of the bus 121 is high and the usage rate of the bus 122 is low, the band monitoring unit 103 uses conservative prefetching for the L1 cache 12 and uses aggressive prefetching for the L2 cache 13. In a case where the usage rates of the bus 121 and the bus 122 are both low, the band monitoring unit 103 uses aggressive prefetching for both of the L1 cache 12 and the L2 cache 13.

In the present embodiment, switching of operation mode between aggressive prefetching and conservative prefetching is performed in the same data access prediction algorithm. However, as long as the number of prefetches may be switched, for example, switching between aggressive prefetching and conservative prefetching may be performed using different data access prediction algorithms. For example, the prefetcher 110 that uses Stream prefetching is operated in conservative prefetching, and both the prefetcher 110 that uses Stream prefetching and the prefetcher 110 that uses Stride prefetching are operated in aggressive prefetching. However, since two prefetchers 110 operate, if both prefetchers prefetch data of the same address block, it is difficult for the L1 cache 12 to specify the data to be used. Accordingly, in this case, the two prefetchers 110 have to prefetch data of different address blocks.

Figure 4:
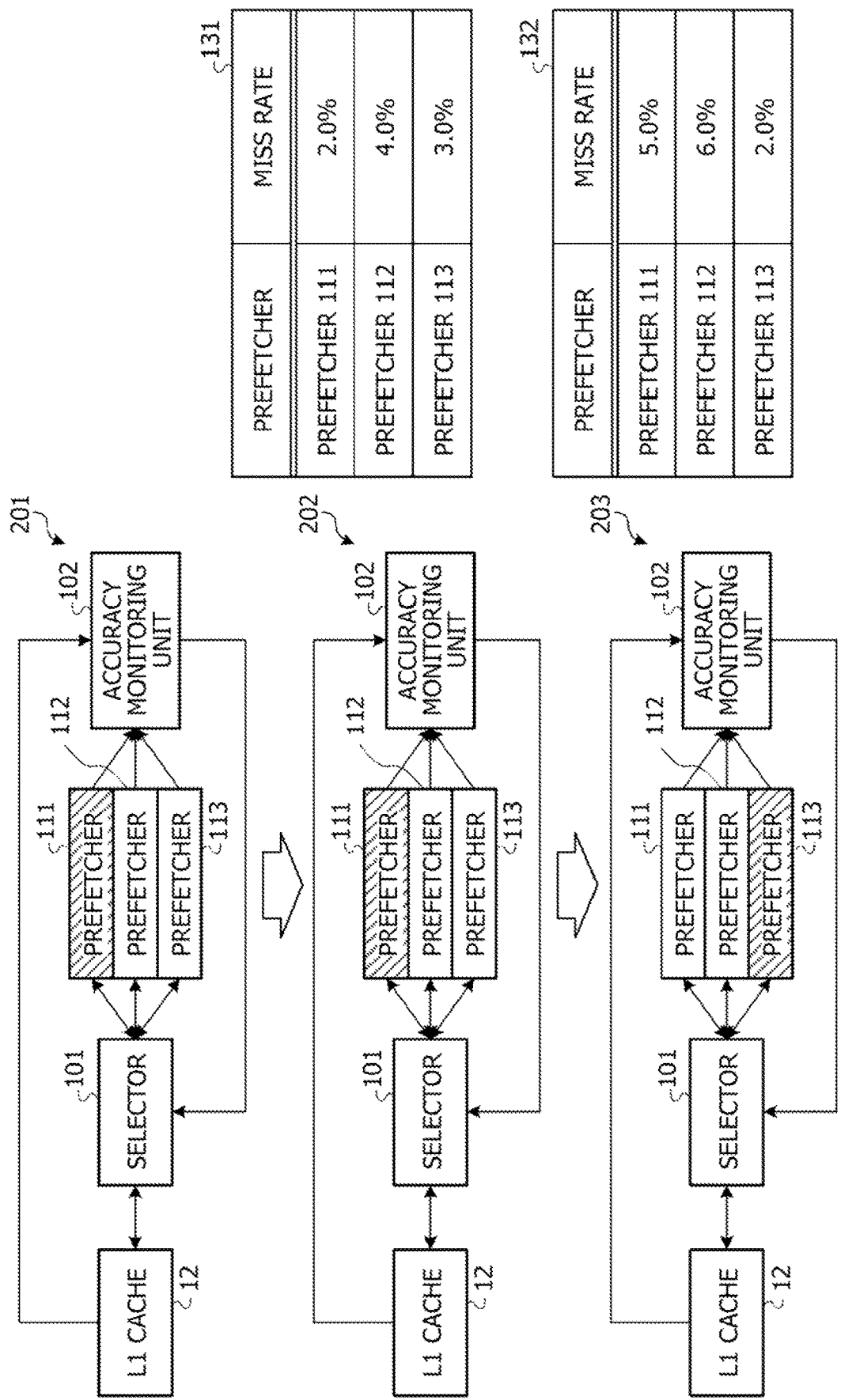
FIG. 4 is a diagram illustrating an example of the operation of selecting a prefetcher.

FIG. 4 is a diagram illustrating an example of the operation of selecting a prefetcher. Next, an example of the operation of selecting the prefetcher 110 will be described with reference to FIG. 4.

State 201 represents a state at the time of activation. The selector 101 has the prefetcher 111 as an initial value. Accordingly, the selector 101 selects the prefetcher 111. As a result, the prefetcher 111 performs prefetching for the L1 cache 12.

After that, when the timing of selecting the prefetcher 110 comes, the accuracy monitoring unit 102 calculates a miss rate of each of the prefetchers 111 to 113, and obtains a calculation result 131 illustrated in state 202. In this case, since the miss rate of the prefetcher 111 is the lowest, the accuracy monitoring unit 102 notifies the selector 101 of the information on the prefetcher 111. As illustrated in state 202, the selector 101 maintains the selected state of the prefetcher 111 without change. In this case, the prefetcher 111 still performs prefetching for the L1 cache 12.

After that, when the timing of selecting the prefetcher 110 comes again, the accuracy monitoring unit 102 calculates a miss rate of each of the prefetchers 111 to 113, and obtains a calculation result 132 illustrated in state 203. In this case, since the miss rate of the prefetcher 113 is the lowest, the accuracy monitoring unit 102 notifies the selector 101 of the information on the prefetcher 113. As illustrated in state 203, the selector 101 selects the prefetcher 113. In this case, the prefetcher 113 performs prefetching for the L1 cache 12.

Figure 5:
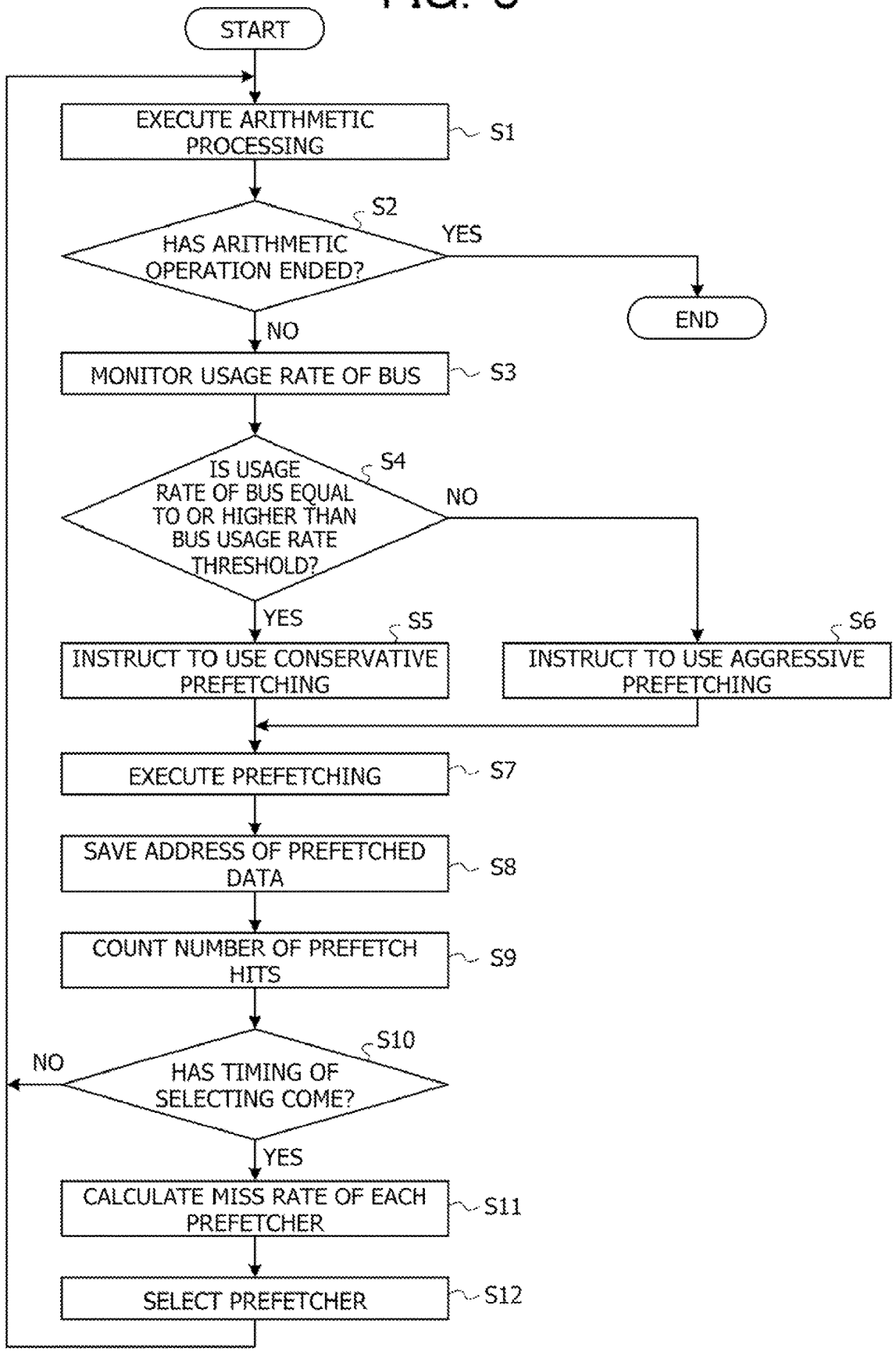
FIG. 5 is a flowchart of arithmetic processing using prefetching in the CPU according to Embodiment 1.

FIG. 5 is a flowchart of arithmetic processing using prefetching in the CPU according to Embodiment 1. Next, arithmetic processing using prefetching in the CPU 10 according to Embodiment 1 will be described with reference to FIG. 5. Prefetch processing in the L1 cache 12 will be described as an example.

The core 11 executes arithmetic processing (step S1).

The core 11 determines whether the arithmetic operation has ended (step S2). When the arithmetic operation has ended (step S2: Yes), the prefetcher 110 ends the prefetch processing.

By contrast, when the arithmetic operation has not ended (step S2: No), the band monitoring unit 103 monitors the usage rate of the bus 121 between the L1 cache 12 and the L2 cache 13 (step S3).

The band monitoring unit 103 determines whether the usage rate of the bus 121 is equal to or higher than the bus usage rate threshold (step S4).

When the usage rate of the bus 121 is equal to or higher than the bus usage rate threshold (step S4: Yes), the band monitoring unit 103 instructs the prefetcher 110 to use conservative prefetching (step S5).

On the other hand, when the usage rate of the bus 121 is lower than the bus usage rate threshold (step S4: No), the band monitoring unit 103 instructs the prefetcher 110 to use aggressive prefetching (step S6).

Each prefetcher 110 executes prefetching when a cache miss occurs (step S7).

Each prefetcher 110 notifies the accuracy monitoring unit 102 of the address of prefetched data. For each prefetcher 110, the accuracy monitoring unit 102 saves the address of prefetched data acquired from each prefetcher 110 in a record (step S8).

The accuracy monitoring unit 102 acquires, from the L1 cache 12, information on the address at which data access has been performed upon the occurrence of the cache miss. If there is the prefetcher 110 that has prefetched, in the past, the address matching the address at which data access has been performed, the accuracy monitoring unit 102 increments the number of prefetch hits of the prefetcher 110 by one. In this way, the accuracy monitoring unit 102 counts the number of prefetch hits of each prefetcher 110 (step S9). The accuracy monitoring unit 102 obtains the number of cache read accesses in the L1 cache 12.

Next, the accuracy monitoring unit 102 determines whether the timing of selecting the prefetcher 110 has come (step S10). When the timing of selecting the prefetcher 110 has not come (step S10: No), the arithmetic processing using prefetching returns to step S1.

By contrast, when the timing of selecting the prefetcher 110 has come (step S10: Yes), the accuracy monitoring unit 102 calculates a miss rate of each prefetcher 110 (step S11). For example, the accuracy monitoring unit 102 calculates a miss rate of each prefetcher 110 by using the number of cache read accesses and the number of prefetch hits of each prefetcher 110.

After that, the accuracy monitoring unit 102 notifies the selector 101 of information on the prefetcher 110 having the lowest miss rate. The selector 101 selects, as the prefetcher 110 that is actually caused to perform prefetching, the prefetcher 110 that the accuracy monitoring unit 102 has notified of (step S12). After that, the arithmetic processing using prefetching returns to step S1.

Although the case where the number of cores 11 illustrated in FIG. 2 is one has been described above as an example, the CPU 10 may take different configurations. For example, the CPU 10 may include a plurality of cores 11. The CPU 10 includes the L1 cache 12 and the L2 cache 13 for each core 11. The selector 101, the accuracy monitoring unit 102, and the prefetcher 110 are disposed for each of the L1 cache 12 and the L2 cache 13. The band monitoring unit 103 may be disposed for each bus extending from each core 11. However, one band monitoring unit 103 may collectively monitor the buses extending from the respective cores 11.

As described above, the CPU according to the present embodiment obtains the prefetch miss rate of each prefetcher, and causes the prefetcher having the lowest miss rate to perform prefetching. Accordingly, prefetching may be performed by using a data access prediction algorithm corresponding to the characteristics of data access of the arithmetic operation performed by a core, and the accuracy of prefetching may be improved. Therefore, the processing performance of arithmetic operation by the CPU may be improved.

The CPU calculates a usage rate of a bus on the upstream side of each cache, for example, a bus in the reading direction. When the usage rate of the bus is low, the CPU causes prefetching for the corresponding cache to be performed using aggressive prefetching. When the usage rate of the bus is high, the CPU causes prefetching for the corresponding cache to be performed using conservative prefetching. Accordingly, a large amount of data may be prefetched in a case where the usage rate of a bus is still low, and the accuracy of prefetching may be further improved. Therefore, the processing performance of arithmetic operation by the CPU may be further improved.

Embodiment 2

Figure 6:
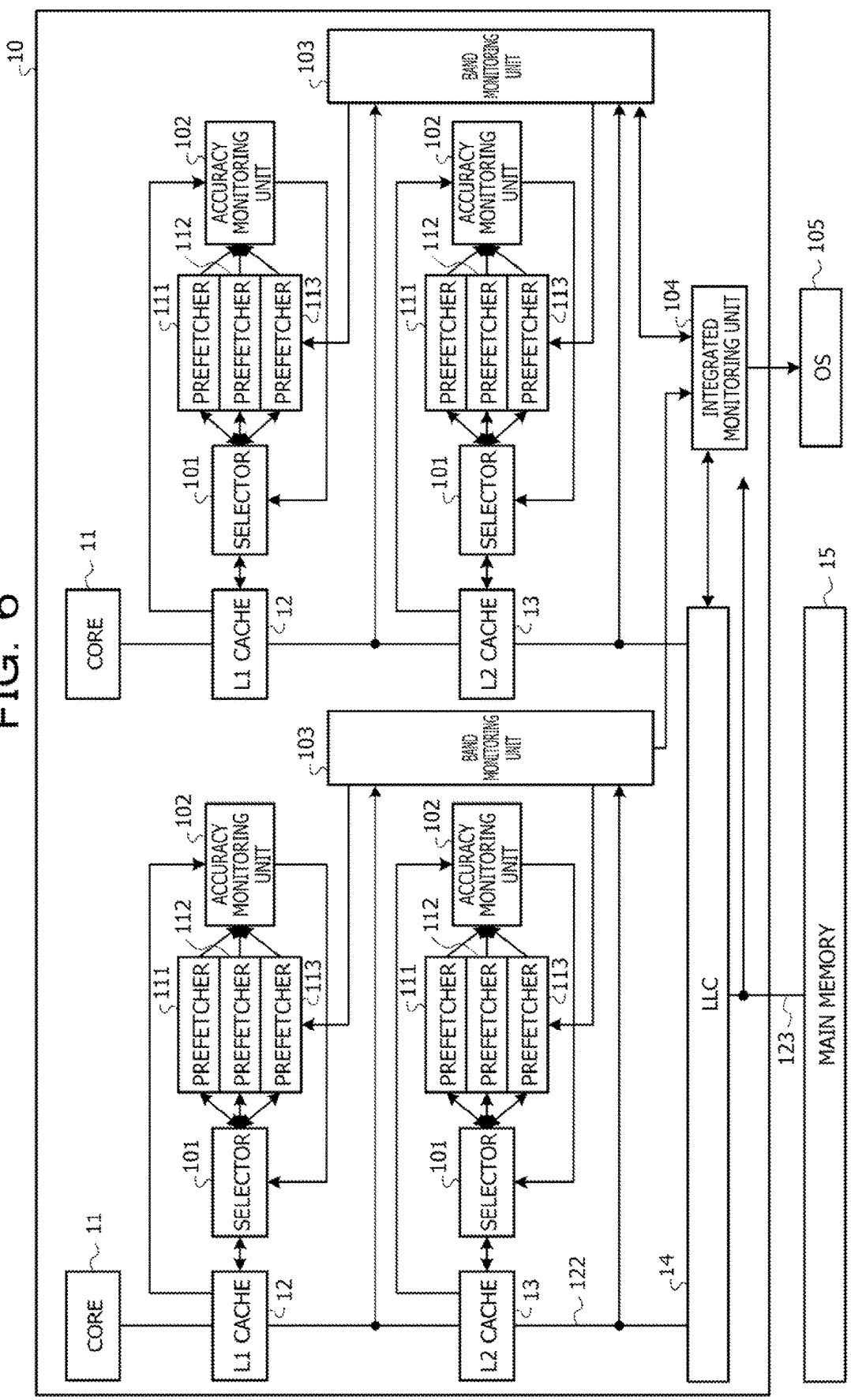
FIG. 6 is a diagram illustrating details of control mechanisms for an L1 cache and an L2 cache in a CPU according to Embodiment 2.

FIG. 6 is a diagram illustrating details of control mechanisms for an L1 cache and an L2 cache in a CPU according to Embodiment 2. When a plurality of threads are executed in the same core 11, a CPU 10 according to the present embodiment detects a decrease in the accuracy of prefetching by threads that perform data access in different patterns. The CPU 10 issues an instruction to migrate the thread for which the accuracy of prefetching has decreased to another OS 105. Details of the operation of thread migration by the CPU 10 according to the present embodiment will be described below. As illustrated in FIG. 6, the CPU 10 according to the present embodiment includes an integrated monitoring unit 104. In the following description, description will be omitted for the operation of each unit similar to that in Embodiment 1.

The CPU 10 according to the present embodiment includes a plurality of cores 11. Each core 11 has a function of SMT, and executes a plurality of threads. An L1 cache 12 and an L2 cache 13 are coupled to a bus extending from each core 11, and a selector 101, prefetchers 111 to 113, and an accuracy monitoring unit 102 are provided for each cache. A band monitoring unit 103 is provided for each core 11. An LLC 14 according to the present embodiment is shared by the plurality of cores 11.

The accuracy monitoring unit 102 calculates a prefetch hit rate of each prefetcher 110 for each thread in the core 11 by using the number of prefetch hits and the number of cache read accesses. The accuracy monitoring unit 102 may calculate a prefetch hit rate by dividing the number of prefetch hits by the number of cache read accesses. For example, the accuracy monitoring unit 102 corresponding to the L1 cache 12 calculates a prefetch hit rate in the L1 cache 12. The accuracy monitoring unit 102 corresponding to the L2 cache 13 calculates a prefetch hit rate in the L2 cache 13.

Each accuracy monitoring unit 102 selects a thread having the lowest prefetch hit rate, for example, a thread having the highest miss rate. Next, each accuracy monitoring unit 102 calculates an average miss rate of the selected thread from the miss rates of the prefetchers 110. Each accuracy monitoring unit 102 outputs the average miss rate of the selected thread to the integrated monitoring unit 104.

The accuracy monitoring unit 102 transmits the data to the integrated monitoring unit 104 in a packet format via the cache and a data path at fixed time intervals. Alternatively, in a case where a dedicated path is wired to the integrated monitoring unit 104, the accuracy monitoring unit 102 may transmit the data by using the dedicated path.

The band monitoring unit 103 calculates, for each thread, a band occupancy rate of a bus 121 between the L1 cache 12 and the L2 cache 13 and a bus 122 between the L2 cache 13 and the LLC 14. The band monitoring unit 103 receives, from the integrated monitoring unit 104, input of information on the amount of data for each thread in a bus 123 between the LLC 14 and a main memory 15. The band monitoring unit 103 calculates, for each thread, a band occupancy rate of the bus 123 between the LLC 14 and the main memory 15. After that, the band monitoring unit 103 outputs the band occupancy rate of each of the buses 121 to 123 to the integrated monitoring unit 104.

The integrated monitoring unit 104 is at the level of the LLC 14. For example, the integrated monitoring unit 104 is coupled to the bus 123 between the LLC 14 and the main memory 15. The integrated monitoring unit 104 is coupled to the LLC 14. The integrated monitoring unit 104 is coupled to the band monitoring unit 103 provided for each core 11.

The integrated monitoring unit 104 periodically receives, from each accuracy monitoring unit 102, input of the average miss rate of the thread selected in each accuracy monitoring unit 102. The integrated monitoring unit 104 acquires information on the amount of data for each thread in the bus 123 between the LLC 14 and the main memory 15, and outputs the information to the band monitoring unit 103. The integrated monitoring unit 104 receives, from each band monitoring unit 103, input of the band occupancy rate of each of the buses 121 to 123 of each thread.

The integrated monitoring unit 104 preliminarily has migration determination thresholds for average miss rate and band occupancy rate. As described below, the integrated monitoring unit 104 determines a thread to be migrated by setting priorities in the order of the average miss rate in the L1 cache 12, the average miss rate in the L2 cache 13, and the band occupancy rate. The integrated monitoring unit 104 may set the number of migration targets, which is the number of threads to be migrated, to one or more than one.

The integrated monitoring unit 104 specifies a thread in which the average miss rate in the L1 cache 12 exceeds the migration determination threshold and the core 11 that executes the thread. When there are threads in which the average miss rate in the L1 cache 12 exceeds the migration determination threshold, the integrated monitoring unit 104 sets, among those threads, the threads of the number of migration targets as migration targets in descending order of average miss rate.

When the number of threads to be migrated has not reached the number of migration targets after migration targets are selected by using the average miss rate in the L1 cache 12, the integrated monitoring unit 104 proceeds to determination of migration targets based on the average miss rate in the L2 cache 13. For example, the integrated monitoring unit 104 specifies a thread in which the average miss rate in the L2 cache 13 exceeds the migration determination threshold and the core 11 that executes the thread. When there are threads in which the average miss rate in the L2 cache 13 exceeds the migration determination threshold, the integrated monitoring unit 104 sets, among those threads, the threads of the number left to reach the number of migration targets as migration targets in descending order of average miss rate.

When the number of threads to be migrated has not yet reached the number of migration targets after migration targets are selected by using the average miss rate in the L2 cache 13, the integrated monitoring unit 104 proceeds to determination of migration targets based on the band occupancy rate. For example, the integrated monitoring unit 104 specifies a thread in which the band occupancy rate exceeds the migration determination threshold and the core 11 that executes the thread. When there are threads in which the band occupancy rate exceeds the migration determination threshold, the integrated monitoring unit 104 sets, among those threads, the threads of the number left to reach the number of migration targets as migration targets in descending order of band occupancy rate.

At a time point when the determination of migration targets based on the band occupancy rate has ended, the integrated monitoring unit 104 ends the selection processing of migration targets even if the number of threads to be migrated has not reached the number of migration targets. For example, when there is no thread in which the average miss rate and/or the band occupancy rate exceed(s) the migration determination threshold, the integrated monitoring unit 104 ends the thread migration processing without performing migration of threads.

When there is the core 11 in which there is no thread in which the miss rate in the L1 cache 12, the miss rate in the L2 cache 13, and/or the band occupancy rate exceed(s) the migration determination threshold, the integrated monitoring unit 104 sets the core 11 as the migration destination. When there is a plurality of cores 11 to be the migration destinations, the integrated monitoring unit 104 selects the cores 11 to be the migration destinations in ascending order of miss rate in the L1 cache 12, in ascending order of miss rate in the L2 cache 13, and in ascending order of band occupancy rate. After that, the integrated monitoring unit 104 outputs, to the OS 105, a migration instruction for migrating the thread determined to be migrated to the core 11 set as the migration destination. For example, the integrated monitoring unit 104 issues a migration instruction to the OS 105 by using system call or the like. As described above, the integrated monitoring unit 104 determines a thread to be migrated and the core 11 of the migration destination based on the miss rate of the prefetcher 110 and the usage rate of each of the buses 121 to 123, and causes the thread to be migrated to be migrated to the core 11 of the migration destination.

FIG. 7 is a diagram illustrating an example of data obtained by an accuracy monitoring unit and a band monitoring unit. In FIG. 7, description will be given for a case in which a plurality of threads operate in each of the plurality of cores 11 including two cores, core #0 and core #1. Description will be given by focusing on thread ##0 operating in core #0 and thread ##1 operating in core #1.

For example, as indicated in table 141 in FIG. 7 as L1 miss rate, the accuracy monitoring unit 102 calculates a miss rate in the L1 cache 12 for thread ##0 of core #0 to be 10% for the prefetcher 111, 8% for the prefetcher 112, and 5% for the prefetcher 113. In this case, the accuracy monitoring unit 102 calculates an average miss rate in the L1 cache 12 for thread ##0 of core #0 to be 7.7%. Similarly, as indicated in table 141 as L2 miss rate, the accuracy monitoring unit 102 calculates a miss rate in the L2 cache 13 for thread ##0 of core #0 to be 5% for the prefetcher 111, 4% for the prefetcher 112, and 3% for the prefetcher 113. In this case, the accuracy monitoring unit 102 calculates an average miss rate in the L2 cache 13 for thread ##0 of core #0 to be 4.0%.

As indicated in table 141, the accuracy monitoring unit 102 calculates a miss rate in the L1 cache 12 for thread ##1 of core #1 to be 3% for the prefetcher 111, 3% for the prefetcher 112, and 1% for the prefetcher 113. In this case, the accuracy monitoring unit 102 calculates an average miss rate in the L1 cache 12 for thread ##1 of core #1 to be 2.3%. Similarly, as indicated in table 141, the accuracy monitoring unit 102 calculates a miss rate in the L2 cache 13 for thread ##1 of core #1 to be 2% for the prefetcher 111, 2% for the prefetcher 112, and 0% for the prefetcher 113. In this case, the accuracy monitoring unit 102 calculates an average miss rate in the L2 cache 13 for thread ##1 of core #1 to be 1.3%.

As indicated in table 141 as L1 to L2 band occupancy rate, the band monitoring unit 103 calculates a band occupancy rate of the bus 121 between the L1 cache 12 and the L2 cache 13 for thread ##0 of core #0 to be 60%. The band monitoring unit 103 calculates a band occupancy rate of the bus from the L2 cache 13 to the main memory 15 as indicated as L2 to Mem band occupancy rate. This bus is obtained by grouping together the bus 122 and the bus 123. In this manner, the band monitoring unit 103 does not have to obtain the band occupancy rate separately for each of the buses 121 to 123, and may obtain the band occupancy rate for any group of the buses. In this case, as indicated in table 141, the band monitoring unit 103 calculates a band occupancy rate of the bus between the L2 cache 13 and the main memory 15 of thread ##0 of core #0 to be 60%.

As indicated in table 141, the band monitoring unit 103 calculates a band occupancy rate of the bus 121 between the L1 cache 12 and the L2 cache 13 of thread ##1 of core #1 to be 10%. As indicated in table 141, the band monitoring unit 103 calculates a band occupancy rate of the bus between the L2 cache 13 and the main memory 15 of thread ##1 of core #1 to be 10%.

The integrated monitoring unit 104 acquires the miss rate in the L1 cache 12, the miss rate in the L2 cache 13 and the band occupancy rate for threads ##0 and ##1 based on the values indicated in table 141 in FIG. 7. The integrated monitoring unit 104 has 5.0% as the migration determination threshold for miss rate, and has 70% as the migration determination threshold for band occupancy rate.

In this case, the integrated monitoring unit 104 determines that the miss rate in the L1 cache 12 for thread ##0 of core #0 is equal to or higher than the migration determination threshold. The integrated monitoring unit 104 sets thread ##0 of core #0 as a migration target.

The integrated monitoring unit 104 determines that the miss rate in the L1 cache 12, the miss rate in the L2 cache 13, and the band occupancy rate do not exceed the migration determination thresholds for thread ##1 of core #1. The integrated monitoring unit 104 checks that the miss rate in the L1 cache 12, the miss rate in the L2 cache 13, and the band occupancy rate do not exceed the migration determination thresholds for the other threads of core #1. After that, the integrated monitoring unit 104 notifies the OS 105 of migration of thread ##0 of core #0 to core #1.

The OS 105 receives, from the integrated monitoring unit 104, input of information on the thread to be migrated and information on the core 11 to be the migration destination, together with the migration instruction. The OS 105 migrates the designated thread to the designated core 11.

As described above, in a multi-core multi-thread environment, the arithmetic processing unit according to the present embodiment sets a thread having a high miss rate and a high band occupancy rate as a migration target and causes the thread to be migrated to a core including a thread having a low miss rate and a low band occupancy rate. Among the threads executed by a certain core, a thread having a higher miss rate than the other threads is considered to have a different data access pattern from the other threads. Accordingly, by migrating the thread having a high miss rate to another core, disturbance of data access pattern may be solved, and a prefetch may be issued appropriately. By migrating a thread having a high band occupancy rate to a core in which each thread has a low band occupancy rate, the band occupancy rate of cores may be made uniform and the number of times of execution using aggressive prefetching may be increased.

Modification Example

In Embodiment 2, migration of a thread is performed using a miss rate and a band occupancy rate. However, migration of a thread may also be performed based on a miss rate without using a band occupancy rate. A case in which migration of a thread is performed based on a miss rate will be described below.

Also in the present modification example, the accuracy monitoring unit 102 corresponding to the L1 cache 12 calculates a prefetch hit rate of each prefetcher 110 in the L1 cache 12. The accuracy monitoring unit 102 corresponding to the L2 cache 13 calculates a prefetch hit rate of each prefetcher 110 in the L2 cache 13. Each accuracy monitoring unit 102 selects a thread having the lowest prefetch hit rate. Next, each accuracy monitoring unit 102 calculates an average miss rate of the selected thread from the miss rates of the prefetchers 110. Each accuracy monitoring unit 102 outputs the average miss rate of the selected thread to the integrated monitoring unit 104.

The integrated monitoring unit 104 specifies a thread in which the average miss rate in the L1 cache 12 exceeds the migration determination threshold and the core 11 that executes the thread, by using the average miss rate of thread transmitted from the accuracy monitoring unit 102 corresponding to the L1 cache 12. When there are threads in which the average miss rate in the L1 cache 12 exceeds the migration determination threshold, the integrated monitoring unit 104 sets, among those threads, the threads of the number of migration targets as migration targets in descending order of average miss rate.

When the number of threads to be migrated has not reached the number of migration targets after migration targets are selected by using the average miss rate in the L1 cache 12, the integrated monitoring unit 104 specifies a thread in which the average miss rate in the L2 cache 13 exceeds the migration determination threshold and the core 11 that executes the thread. When there are threads in which the average miss rate in the L2 cache 13 exceeds the migration determination threshold, the integrated monitoring unit 104 sets, among those threads, the threads of the number left to reach the number of migration targets as migration targets in descending order of average miss rate. As described above, in the present modification example, the integrated monitoring unit 104 determines a thread to be migrated by setting priorities in the order of a thread having a high average miss rate in the L1 cache 12 and then a thread having a high average miss rate in the L2 cache 13.

Next, the integrated monitoring unit 104 determines the core 11 to be the migration destination. After that, the integrated monitoring unit 104 outputs, to the OS 105, a migration instruction for migrating the thread determined to be migrated to the core 11 set as the migration destination. For example, the integrated monitoring unit 104 issues a migration instruction to the OS 105 by using system call or the like. For example, the integrated monitoring unit 104 determines a thread to be migrated and the core 11 of the migration destination based on a miss rate, and causes the thread to be migrated to be migrated to the core 11 of the migration destination.

As described above, migration of a thread may also be performed based on a miss rate without using a band occupancy rate. Also in this case, by migrating a thread having a high miss rate to another core, disturbance of data access pattern may be solved, and a prefetch may be issued appropriately.

Embodiment 3

FIG. 8 is a diagram illustrating details of control mechanisms for an L1 cache and an L2 cache in a CPU according to Embodiment 3. A CPU 10 according to the present embodiment provides a user with information such as the accuracy of a prefetcher 110 and the usage rate of a data bus. The CPU 10 according to the present embodiment includes an information management unit 106. An information processing apparatus 1 includes a display device 17.

Each accuracy monitoring unit 102 outputs the miss rate of each prefetcher 110 to the information management unit 106. A band monitoring unit 103 outputs the usage rate of a bus 121 between an L1 cache 12 and an L2 cache 13 and the usage rate of a bus 122 between the L2 cache 13 and an LLC 14 to the information management unit 106.

The information management unit 106 receives input of the miss rate of each prefetcher 110 from the accuracy monitoring unit 102. The information management unit 106 receives the usage rate of the bus 121 between the L1 cache 12 and the L2 cache 13 and the usage rate of the bus 122 between the L2 cache 13 and the LLC 14 from the band monitoring unit 103. The information management unit 106 acquires information on the program counter from the core 11.

Next, the information management unit 106 specifies a portion in the program counter where the miss rate of the prefetcher 110 in the L1 cache 12 is equal to or higher than a predetermined miss rate threshold. The information management unit 106 specifies a portion in the program counter where the miss rate of the prefetcher 110 in the L2 cache 13 is equal to or higher than the predetermined miss rate threshold. The information management unit 106 specifies a portion in the program counter where the usage rate of the bus 121 between the L1 cache 12 and the L2 cache 13 is equal to or higher than a predetermined usage rate threshold. The information management unit 106 specifies a portion in the program counter where the usage rate of the bus 122 between the L2 cache 13 and the LLC 14 is equal to or higher than the predetermined usage rate threshold.

The information management unit 106 generates information indicating the portion of a program executed by the core 11 corresponding to the specified portion. For example, the information management unit 106 generates information indicating the portion of a program written by a user in which a decrease in prefetching accuracy or an increase in bus usage rate is large. After that, the information management unit 106 outputs, to the display device 17, the information indicating the portion of a program written by the user in which a decrease in prefetching accuracy or an increase in bus usage rate is large. For example, the information management unit 106 acquires the program counter for the executed program from the core 11. The information management unit 106 compares the miss rate monitored by the accuracy monitoring unit 102 and the usage rate monitored by the band monitoring unit 103 with the program counter, generates relationship information between the program and the miss rate and the usage rate, and provides the user with the generated relationship information.

The display device 17 receives, from the information management unit 106, input of the information indicating the portion of a program written by the user in which a decrease in prefetching accuracy or an increase in bus usage rate is large. The display device 17 causes the information indicating the portion of a program written by the user in which a decrease in prefetching accuracy or an increase in bus usage rate is large to be displayed on the screen, and provides the user with the information.

The user checks the information indicating the portion of a program written by the user in which a decrease in prefetching accuracy or an increase in bus usage rate is large, the information being displayed on the screen by the display device 17. The user tunes the program by using the information indicating the portion of a program written by the user in which a decrease in prefetching accuracy or an increase in bus usage rate is large, and evaluates the performance by causing the core 11 to re-execute the tuned program or in other ways.

For example, an example of tuning is to change a portion of a program indirectly accessing an array via an index list by rewriting the portion so as to directly access the data array. This improves the accuracy of prediction of an access pattern by the prefetcher 110 in some cases.

As described above, the CPU according to the present embodiment provides a user with information indicating the portion of a program written by the user in which a decrease in prefetching accuracy or an increase in bus usage rate is large. This enables the user to appropriately tune the program, and the performance of arithmetic processing may be improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing apparatus comprising:
   a plurality of caches that is hierarchically disposed between a core and a main memory;
   prefetchers that are disposed in a plurality of numbers for each of the caches and have different data access prediction algorithms; and
   a processor configured to:
   monitor, for each of the caches, a miss rate of prefetching by each of the prefetchers;
   determine a prefetcher to be caused to perform prefetching based on the miss rate;
   monitor a usage rate of any or all of buses between the caches or between the caches and the main memory in a reading direction;
   cause the prefetchers corresponding to the caches on a side of the core of a low usage rate bus in which the usage rate is low to issue a prefetch with high probability and a prefetch with low probability; and
   cause the prefetchers corresponding to the caches on a side of the core of a high usage rate bus in which the usage rate is high to stop issuing the prefetch with low probability and to issue the prefetch with high probability.

2. The arithmetic processing apparatus according to claim 1,
   wherein the processor holds a prefetching result of each of the prefetchers in each of the caches for a past predetermined period, and calculates the miss rate of each of the prefetchers based on information on data that has been accessed in the predetermined period and the prefetching result.

3. The arithmetic processing apparatus according to claim 1,
   wherein the processor determines to cause a low miss rate prefetcher in which the miss rate is lowest to perform prefetching, and
   causes the low miss rate prefetcher corresponding to the caches on a side of the core of a low usage rate bus in which the usage rate is low to issue the prefetch with high probability and the prefetch with low probability, and causes the low miss rate prefetcher corresponding to the caches on a side of the core of a high usage rate bus in which the usage rate is high to stop issuing the prefetch with low probability and to issue the prefetch with high probability.

4. The arithmetic processing apparatus according to claim 1,
   wherein the core exists in a plurality of numbers, and each core operates a plurality of threads, and
   the processor determines a thread to be migrated and a core of a migration destination based on the miss rate, and causes the thread to be migrated to be migrated to the core of a migration destination.

5. The arithmetic processing apparatus according to claim 4,
   wherein the processor determines the thread to be migrated and the core of a migration destination based on the miss rate and the usage rate.

6. The arithmetic processing apparatus according to claim 1,
   wherein the processor acquires a program counter for an executed program from the core, compares the miss rate and the usage rate with the program counter, generates relationship information between the program and the miss rate and the usage rate, and outputs the generated relationship information.

7. An arithmetic processing method comprising:
   monitoring, for each of a plurality of caches that is hierarchically disposed between a core and a main memory, a miss rate of prefetching by each of the prefetchers;
   determining a prefetcher to be caused to perform prefetching based on the miss rate from among prefetchers that are disposed in a plurality of numbers for each of the caches and have different data access prediction algorithms;
   monitoring a usage rate of any or all of buses between the caches or between the caches and the main memory in a reading direction;
   causing the prefetchers corresponding to the caches on a side of the core of a low usage rate bus in which the usage rate is low to issue a prefetch with high probability and a prefetch with low probability; and
   causing the prefetchers corresponding to the caches on a side of the core of a high usage rate bus in which the usage rate is high to stop issuing the prefetch with low probability and to issue the prefetch with high probability.

* * * * *